(12) United States Patent
Nugent

(10) Patent No.: US 6,215,732 B1
(45) Date of Patent: Apr. 10, 2001

(54) EXPENDABLE DEVICE FOR MEASUREMENT OF SOUND VELOCITY PROFILE

(75) Inventor: David M. Nugent, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/405,304

(22) Filed: Sep. 17, 1999

(51) Int. Cl.[7] .................................................. H04B 11/00
(52) U.S. Cl. ............................................. 367/134; 367/902
(58) Field of Search .................................. 367/902, 134, 367/131, 89, 13, 4, 3

(56) References Cited

U.S. PATENT DOCUMENTS 3,611,276 * 10/1971 Massa ................................... 367/134
4,093,934 * 6/1978 Urick et al. .............................. 367/3

* cited by examiner

Primary Examiner—Daniel T. Pihulic
(74) Attorney, Agent, or Firm—Michael J. McGowan; Michael F. Oglo; Prithvi C. Lall

(57) ABSTRACT

A system for determining the sound velocity profile in a medium, such as water, includes an acoustic signal transmitting system at a transmitting location and an acoustic signal receiving and processing system at a receiving location. In one example, the acoustic signal receiving and processing system is located in a submarine or other similar vessel, and the acoustic signal transmitting system is located in an expendable vehicle or probe that moves throughout the water surrounding the submarine or vessel. At one or more transmission times and transmitting locations, the acoustic signal transmitting system transmits an acoustic signal. The acoustic signal receiving and processing system receives each acoustic signal at an arrival time and determines the sound velocity in the water between the transmitting location and the receiving location using the arrival time, the predetermined transmission time, and the predetermined transmitting location. Using the sound velocity calculated based upon multiple transmitting locations, a sound velocity profile is determined within the water.

17 Claims, 2 Drawing Sheets

EXPENDABLE DEVICE FOR MEASUREMENT OF SOUND VELOCITY PROFILE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to a system and method for measuring a sound velocity profile in a medium and particularly, to a system and method that uses an expendable vehicle to measure a sound velocity profile in a body of water surrounding a submarine or other water vessel.

(2) Description of the Prior Art

Underwater sonic equipment has many uses including, for example, fish and depth finding as well as sophisticated ranging and navigating. This equipment typically transmits a sonic signal from an underwater vessel, such as a submarine, and detects the return of an echo signal. Calculations based upon the elapse of time between the transmission of a sonic signal and the return of an echo makes it possible to ascertain the distance between the sonic transmitter and the object reflecting the sonic energy. Thus, knowledge of the sound velocity in the water between the submarine and the target is important to accurately interpret the acoustic data received from the sonar.

The sound velocity in water varies with localized conditions, such as water temperature, density, depth, salinity, and other factors. The sound velocity should therefore be measured at numerous points between the submarine or other such vessel and the target in order to obtain an accurate sound velocity profile. The present devices and techniques for measuring sound velocity, however, have a number of disadvantages.

One technique includes determining the velocity of sound by measuring the water temperature, salinity and other factors at given depths and then empirically finding the velocity using charts, tables and other data. These techniques are inherently inaccurate and time consuming. Another limitation is that the sound velocity can only be determined in those regions in which the temperature and other conditions can be measured.

Attempts have been made to measure the velocity directly within the medium itself, for example, using unmanned underwater vehicles (UUVs). Although the sound can be measured directly at locations remote from the submarine or other such vessel, the existing devices typically used to provide this direct measurement, e.g., conductivity-temperature-depth measuring devices (CDT), are expensive and require a relatively large, expensive vehicle for deployment. These devices must also be connected to the submarine or vessel using a fiber optic cable to relay the measured data back to the submarine. Because of the expensive equipment used in the UUV, the UUV must be recovered at the completion of its mission, a potentially dangerous and time consuming undertaking under combat conditions. Moreover, the submarine or other deployment vessel must be modified to allow it to recover the UUV.

SUMMARY OF THE INVENTION

Accordingly, one object of the present invention is a system and method for measuring a sound velocity profile within a medium, such as a body of water, at a relatively wide range of locations.

Another object of the present invention is a system and method for measuring the sound velocity profile in a medium that uses an expendable device that does not have to be physically connected to the submarine or vessel and does not have to be recovered.

A further object of the present invention is to measure the sound velocity profile in a body of water around a submarine or vessel in a covert manner.

The present invention features a system and method for measuring sound velocity in a medium, such as a body of water. The system comprises an acoustic signal transmitting system disposed at a transmitting location in the medium for transmitting one or more acoustic signals through the medium at a predetermined transmission time. An acoustic signal receiving and processing system is disposed at a receiving location remote from the transmitting location for receiving the acoustic signal at an arrival time. The acoustic signal receiving and processing system processes the acoustic signal to determine a sound velocity in the medium between the transmitting location and the receiving location based upon the predetermined transmission time, the arrival time, and a distance between the transmitting location and the receiving location.

In the preferred embodiment, the acoustic signal transmitting system includes a first precision clock, and the acoustic signal receiving and processing system includes a second precision clock substantially synchronized with the first precision clock. The acoustic signal transmitting system preferably includes a controller, responsive to the first precision clock, for controlling transmission of the acoustic signal at the predetermined transmission time, and a transmitter, responsive to the controller, for transmitting the acoustic signal.

The acoustic signal receiving and processing system preferably includes a receiver, for receiving the acoustic signal at the arrival time, an acoustic processor, responsive to the receiver and the second precision clock, for processing the acoustic signal and for determining the arrival time of the acoustic signal, and a calculator, responsive to the acoustic processor, for determining the sound velocity in the medium between the transmitting location and the receiving location based upon the predetermined transmission time, the arrival time, and the distance between the transmitting location and the receiving location.

In one example, the acoustic signal transmitting system is disposed on an expendable underwater vessel, and the acoustic signal receiving and processing system is disposed on a submarine.

The method of measuring the sound velocity in the medium comprises the steps of predetermining at least one predetermined transmitting location and at least one predetermined transmission time for transmitting at least one acoustic signal from an acoustic signal transmitting system, transmitting the acoustic signal at the predetermined transmission time through the medium from the acoustic signal transmitting system at the transmitting location, receiving the acoustic signal at an arrival time in an acoustic signal receiving system at a receiving location remote from the predetermined transmitting location, and calculating a sound velocity in the medium between the transmitting location and the receiving location using the arrival time, the predetermined transmission time, and a distance between the predetermined transmitting location and the receiving location. The calculating is performed by the acoustic signal receiving and processing system at the receiving location.

The preferred method includes predetermining a plurality of predetermined transmitting locations and predetermined transmission times. The sound velocity in the medium between each of the transmitting locations and receiving locations form a sound velocity profile. The acoustic signals can be transmitted at a single frequency or in a range of frequencies. The frequency of each acoustic signal can also be varied with time.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
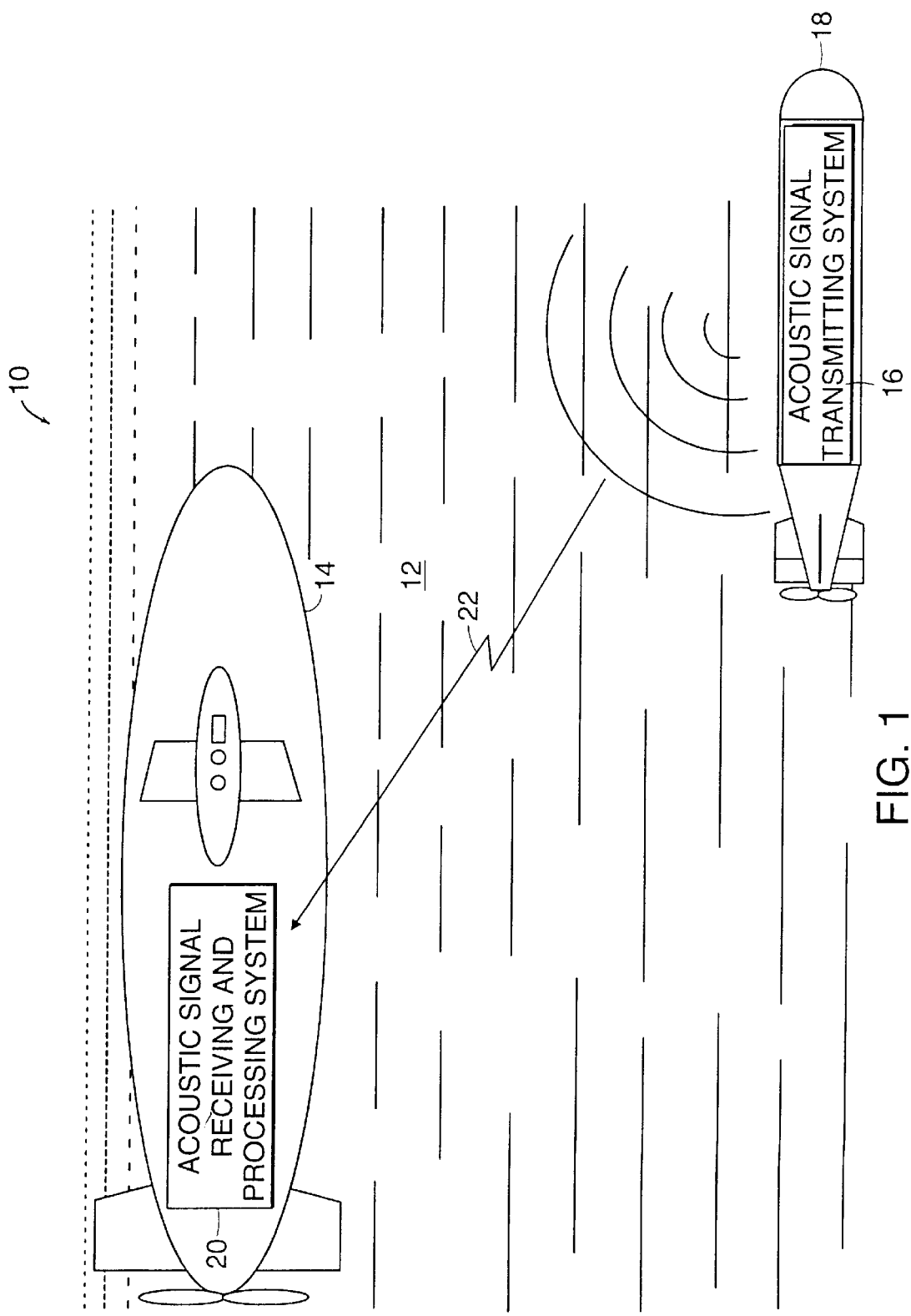
FIG. 1 is a schematic diagram of the system for measuring a sound velocity profile in a medium, according to the present invention.

The sound velocity measurement system 10, FIG. 1, according to the present invention, is used to determine a sound velocity profile in a medium, such as a body of water 12 surrounding a submarine or other similar vessel 14. The system 10 measures the sound velocity at a plurality of locations in the water 12 to develop the sound velocity profile along a path through the water 12. The sound velocity measurement system 10 generally includes an acoustic signal transmitting system 16 disposed on an expendable vehicle 18 capable of moving to the various locations in the water 12 and an acoustic signal receiving and processing system 20 disposed on the submarine or other similar underwater vessel 14. The acoustic signal transmitting system 16 transmits an acoustic signal 22 from each of the locations in the water 12. The acoustic signal receiving and processing system 20 receives the acoustic signal 22 and determines the sound velocity in the water 12 based upon the speed of the acoustic signal 22 traveling through the medium 22, as will be described in greater detail below.

Although the exemplary embodiment shows an underwater vessel 14, the sound velocity measurement system 10 can also be used with a ship or other surface vessel that floats on the surface of the water 12. The present invention also contemplates determining a sound velocity profile in other types of media, such as air, and using another types of vessels, such as an aircraft. The expendable vehicle 18 can be any type of self-propelled vehicle capable of moving through the water 12 or other type of medium. For example, it may be a modified expendable mobile acoustic torpedo large, powered by a lithium battery.

The sound velocity in the water 12 between the expendable vehicle 18 and the underwater vessel 14 depends upon the transmitting location of the expendable vehicle 18 relative to the receiving location of the underwater vessel 14, the transmission time of the acoustic signal 22, and the arrival time of the acoustic signal 22. The sound velocity can be calculated according to the following equation:

$$v = \Delta d / \Delta t \quad (1)$$

where $\Delta d$ is the distance between the transmitting location and receiving location, and $\Delta t$ is the travel time or time elapsed between the transmission time $t_t$ and the arrival time $t_a$. The acoustic signal transmitting system 12 preferably transmits at least one acoustic signal 22 at a plurality of different transmitting locations as the expendable vehicle 18 travels through the water 12. The sound velocities calculated based upon each of the transmitting locations in the water 12 represent a sound velocity profile in the water 12 along the path traveled by the expendable vehicle 18.

Figure 2:
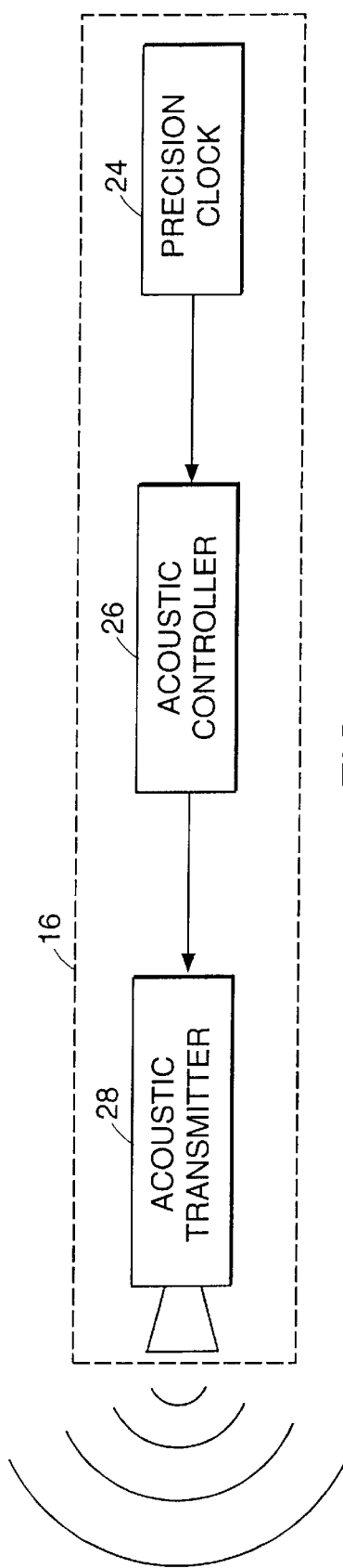
FIG. 2 is a schematic block diagram of an acoustic signal transmitting system, according to the present invention.

The preferred embodiment of the acoustic signal transmitting system 16, FIG. 2, includes a first precision clock 24, an acoustic controller 26, and an acoustic transmitter 28. In response to the precision clock 24, the acoustic controller 26 causes the acoustic transmitter 28 to transmit the acoustic signal 22 at a predetermined transmission time. In one example, the acoustic controller 26 is a switch that causes the transmitter 28 to transmit a single tone acoustic signal (commonly referred to as a ping) at predetermined time intervals. The acoustic controller 26 can also cause the transmitter 28 to transmit acoustic signals 22 in a range of frequencies, for example, varying the frequency of the acoustic signal 22 with time.

Figure 3:
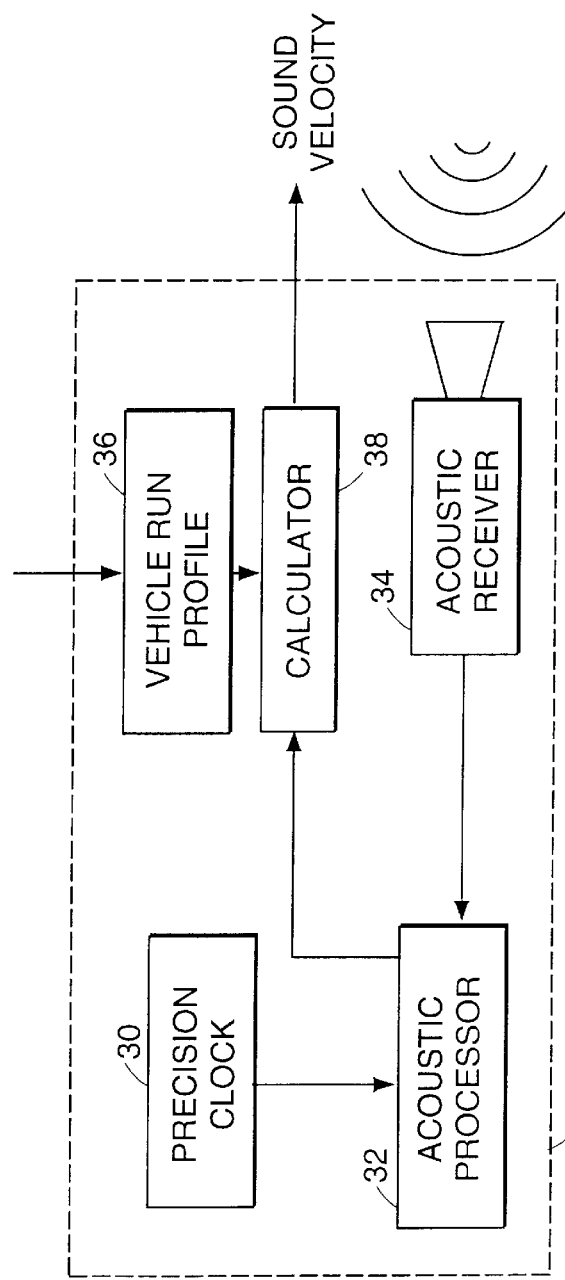
FIG. 3 is a schematic block diagram of an acoustic signal receiving and processing system, according to the present invention.

The preferred embodiment of the acoustic signal receiving and processing system 20, FIG. 3, includes a second precision clock 30, an acoustic processor 32, an acoustic receiver 34, and an acoustic calculator 38. The transmission time and transmitting location for each acoustic signal 22 to be transmitted by the acoustic transmitter 28 of the transmitting system 16 described above is preferably predetermined and stored in the receiving and processing system 20. In one example, a vehicle run profile 36 defines the path of the expendable vehicle 18 relative to the submarine 14 and the predetermined transmission times or time intervals at which acoustic signals 22 are transmitted by the transmitting system 16.

The acoustic receiver 34 receives each acoustic signal 22 transmitted by the acoustic transmitter 28 as well as other acoustic signals or noise present in the surrounding environment. The acoustic processor 32 processes the received acoustic signals 22, for example, by filtering out the other acoustic signals or noise and selecting the desired frequency or frequency range of each acoustic signal 22 transmitted by the acoustic transmitter 28. Using the second precision clock 30, the acoustic processor 32 then determines the arrival time of each acoustic signal 22 as they are received. The second precision clock 30 is preferably synchronized with the first precision clock 24 so that the travel time for the acoustic signal 22 can be accurately determined from the predetermined transmission time stored in the vehicle run profile 36 and the arrival time determined by the second precision clock 30.

The calculator 38 is responsive to the acoustic processor 32 and calculates the sound velocity for each of the acoustic signals 22 received and processed by the acoustic processor 32. For each of the acoustic signals 22, the calculator 38 determines the travel time $\Delta$, the distance traveled $\Delta$, and the sound velocity according to Equation 1. The acoustic signal receiving and processing system 20 can be implemented as electronic circuitry or as software on a PC having a sound processing card. The vehicle run profile 36 can be obtained from a standard launch control box used on underwater vessels.

The method of determining a sound velocity profile in the water surrounding the submarine or vessel 14 preferably begins by synchronizing the first and second precision clocks 24, 30 and downloading the vehicle run profile 36 to the acoustic signal receiving and processing system 20 prior to deployment of the expendable vehicle 18. The expendable vehicle 18 is then deployed from the submarine 14 and moves through the water 12 along a path determined by the vehicle run profile 36. At predetermined transmission times determined by the first precision clock 24, the acoustic controller 26 causes the acoustic transmitter 28 to transmit an acoustic signal 22.

When each acoustic signal 22 is received by the acoustic receiver 34, the acoustic processor 32 filters out the undesired acoustic noise and determines the arrival time from the precision clock 30. The calculator 38 then calculates the sound velocity in the water 12 along the path between the expendable vehicle 18 at that predetermined transmitting location and the underwater vessel 14. When multiple acoustic signals 22 are transmitted and received, sound velocities are calculated at multiple transmitting locations throughout the water between the underwater vessel 14 and vehicle 18, thereby forming a sound velocity profile in the surrounding water.

In one embodiment, the frequencies and time intervals of the transmitted acoustic signals can be varied, allowing the sound velocity profile to be determined in a more covert manner. The method can also include beamforming the acoustic signal to focus the signal in the direction of the submarine or underwater vessel, thereby preventing the signal from being detected or received by other submarines or vessels.

Accordingly, the system and method of the present invention determines the sound velocity profile in water surrounding a submarine or other type of vessel without having to rely on inaccurate charts, thus improving the detection and localization abilities of the submarine or vessel. The system and method of the present invention calculates the sound velocity at the submarine or vessel, allowing the use of an expendable vehicle or probe that does not require complex and expensive measuring devices. Moreover, the system and method of the present invention allows a sound velocity profile to be determined in the water surrounding a submarine or vessel in a relatively covert manner that is undetectable by other submarines or vessels.

In light of the above, it is therefore understood that within the scope of the appended claims, the invention may be practiced otherwise than as specifically described.

What is claimed is:

1. A system for measuring sound velocity in a medium, said system comprising:
   an acoustic signal transmitting system, disposed at a transmitting location in said medium, for transmitting at least one acoustic signal through said medium at a predetermined transmission time from said transmitting location; and
   an acoustic signal receiving and processing system, disposed at a receiving location remote from said transmitting location, for receiving said at least one acoustic signal at an arrival time, and for processing said at least one acoustic signal to determine a sound velocity in said medium between said transmitting location and said receiving location based upon said predetermined transmission time, said arrival time, and a distance between said transmitting location and said receiving location.

2. The system of claim 1 wherein said acoustic signal transmitting system includes a first precision clock, wherein said acoustic signal receiving and processing system includes a second precision clock, and wherein said first precision clock and said second precision clock are substantially synchronized.

3. The system of claim 2 wherein said acoustic signal transmitting system further includes:

a controller, responsive to said first precision clock, for controlling transmission of said at least one acoustic signal at said predetermined transmission time; and
   a transmitter, responsive to said controller, for transmitting said at least one acoustic signal.

4. The system of claim 3 wherein said controller causes said transmitter to transmit said at least one acoustic signal at a single tone.

5. The system of claim 3 wherein said controller causes said transmitter to transmit acoustic signals in a range of frequencies.

6. The system of claim 3 wherein said controller causes said transmitter to transmit acoustic signals at frequencies that vary with time.

7. The system of claim 2 wherein said acoustic signal receiving and processing system includes:
   a receiver, for receiving said at least one acoustic signal at said arrival time;
   an acoustic processor, responsive to said receiver and said second precision clock, for processing said acoustic signal and for determining said arrival time of said acoustic signal; and
   a calculator, responsive to said acoustic processor, for determining said sound velocity in said medium between said transmitting location and said receiving location based upon said predetermined transmission time, said arrival time, and said distance between said transmitting location and said receiving location.

8. The system of claim 7 wherein said distance between said transmitting location and said receiving location is predetermined and stored in said acoustic signal receiving and processing system.

9. The system of claim 1 wherein said acoustic signal transmitting system transmits a plurality of acoustic signals at a plurality of predetermined transmission times and predetermined transmitting locations such that said sound velocity in said medium between said receiving location and each of said plurality of transmitting locations forms a sound velocity profile in said medium.

10. The system of claim 1 wherein said medium includes a body of water, and wherein said acoustic signal transmitting system is disposed on an expendable underwater vessel.

11. The system of claim 10 wherein said acoustic signal receiving and processing system is disposed on a submarine.

12. A method of measuring a sound velocity in a medium, said method comprising the steps of:
   pre-determining at least one predetermined transmitting location and at least one predetermined transmission time for transmitting at least one acoustic signal from an acoustic signal transmitting system;
   transmitting said at least one acoustic signal at said at least one predetermined transmission time through said medium from said acoustic signal transmitting system at said at least one transmitting location;
   receiving said at least one acoustic signal at an arrival time in an acoustic signal receiving system at a receiving location remote from said at least one predetermined transmitting location; and
   calculating a sound velocity in said medium between said transmitting location and said receiving location using said arrival time, said predetermined transmission time, and a distance between said transmitting location and said receiving location, wherein said calculating is performed by said acoustic signal receiving and processing system at said receiving location.

13. The method of claim 12 wherein pre-determining said at least one predetermined transmitting location and said at least one predetermined transmission time includes pre-determining a plurality of predetermined transmitting locations and predetermined transmission times, and wherein said sound velocity in said medium between each of said predetermined plurality of transmitting locations and said receiving location form a sound velocity profile.

14. The method of claim 12 wherein transmitting said at least one acoustic signal includes transmitting an acoustic signal at a single frequency.

15. The method of claim 12 wherein transmitting said at least one acoustic signal includes transmitting a plurality of acoustic signals in a range of frequencies.

16. The method of claim 15 wherein said range of frequencies of said plurality of acoustic signals varies with time.

17. The method of claim 12 wherein said acoustic signal transmitting system is disposed on an expendable vehicle, and wherein said step of pre-determining said at least one predetermined transmitting location and said at least one predetermined transmission time includes downloading a vehicle run profile to said acoustic signal receiving and processing system.

* * * * *